Sept. 20, 1966 K. R. SCHNEIDER 3,274,043
LABELING MACHINE
Filed Jan. 29, 1962 5 Sheets-Sheet 1

INVENTOR
KURT R. SCHNEIDER
BY Mason, Porter, Diller & Stewart,
ATTORNEYS

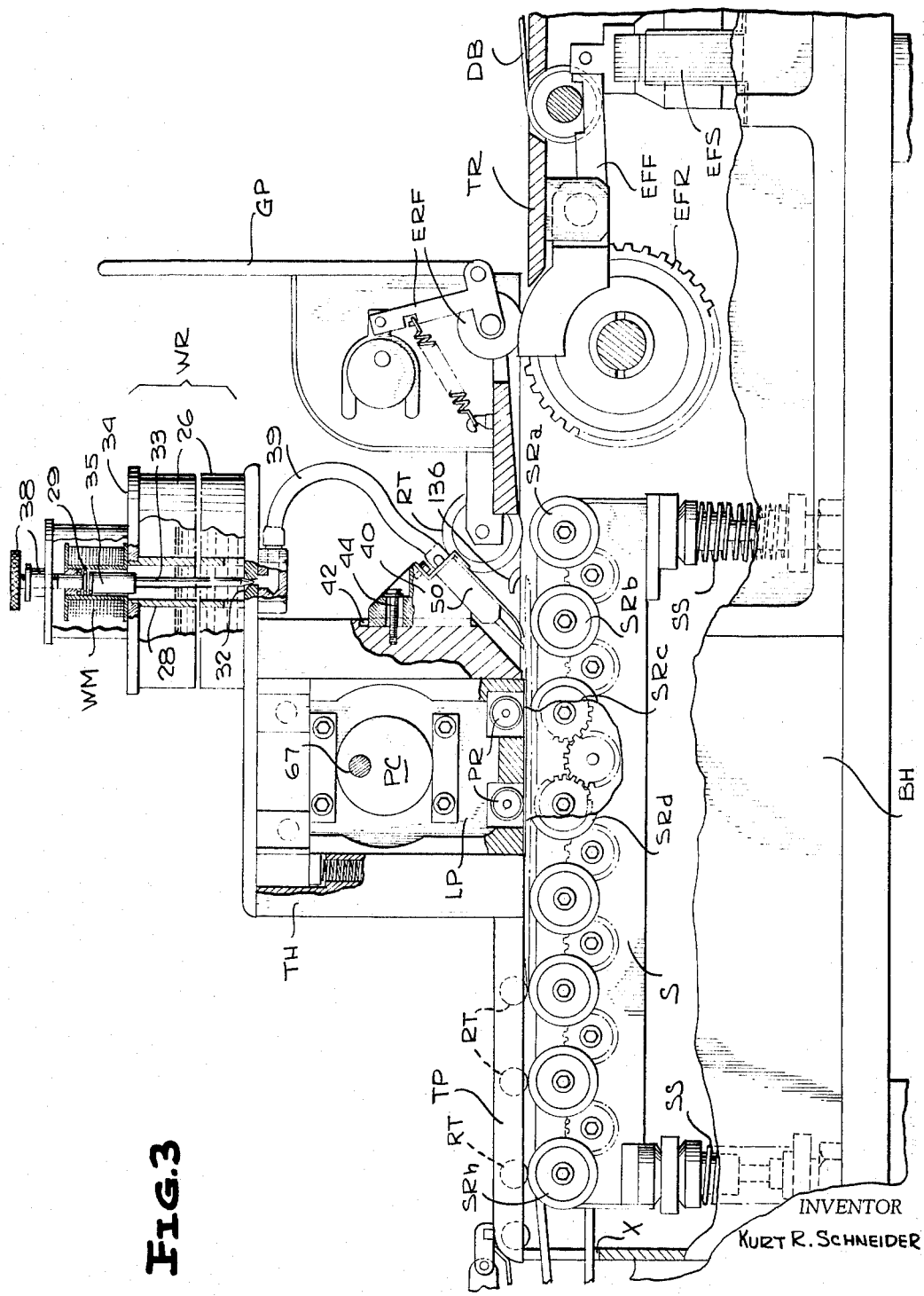

Sept. 20, 1966  K. R. SCHNEIDER  3,274,043
LABELING MACHINE
Filed Jan. 29, 1962  5 Sheets-Sheet 3
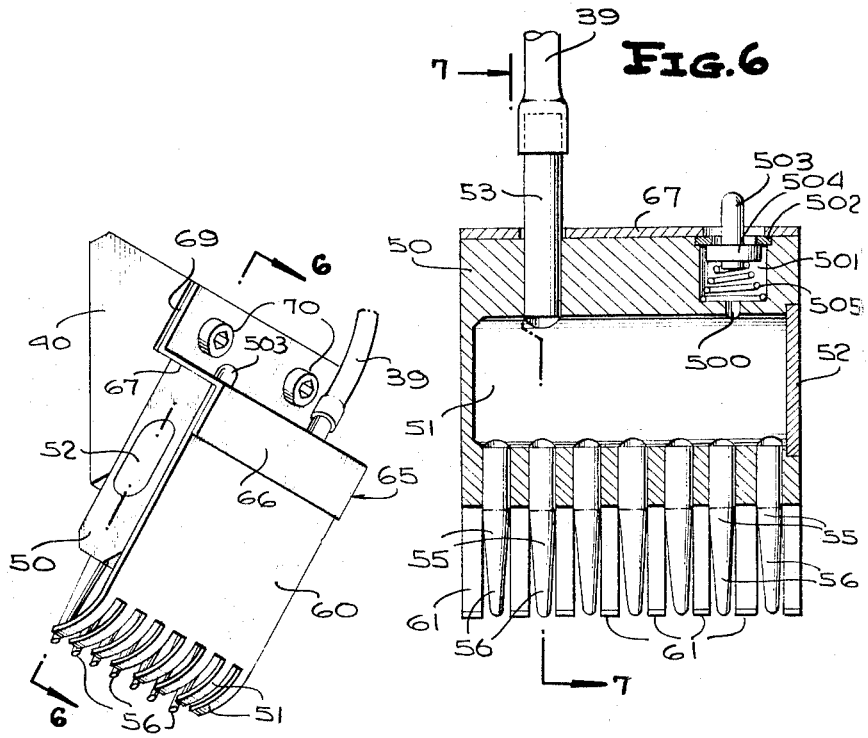
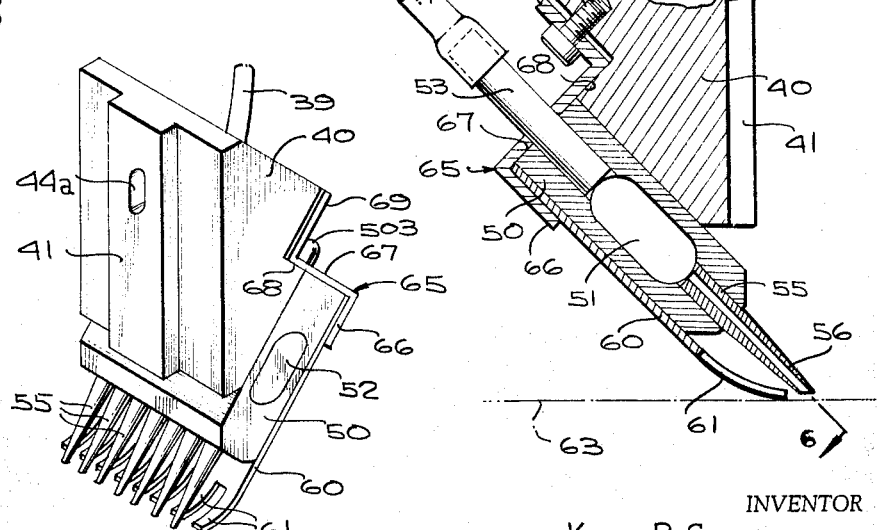
INVENTOR
KURT R. SCHNEIDER
BY Mason, Porter, Diller & Stewart,
ATTORNEYS

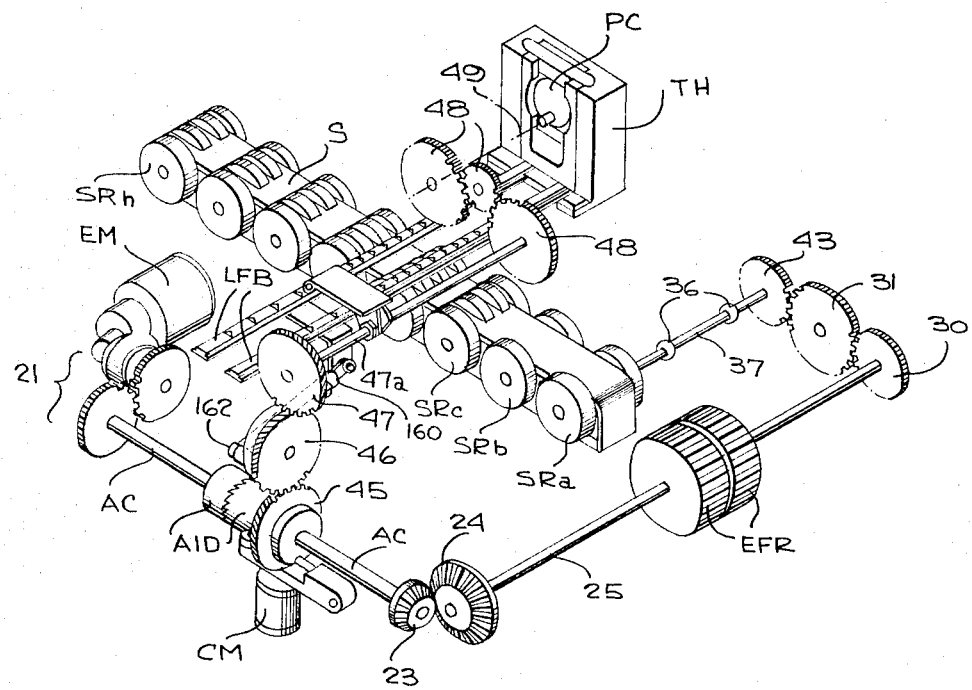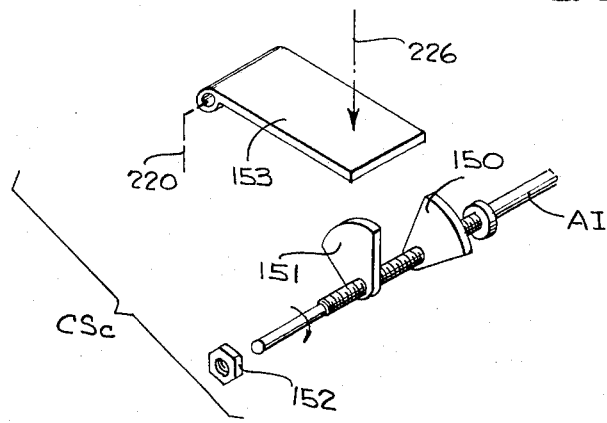

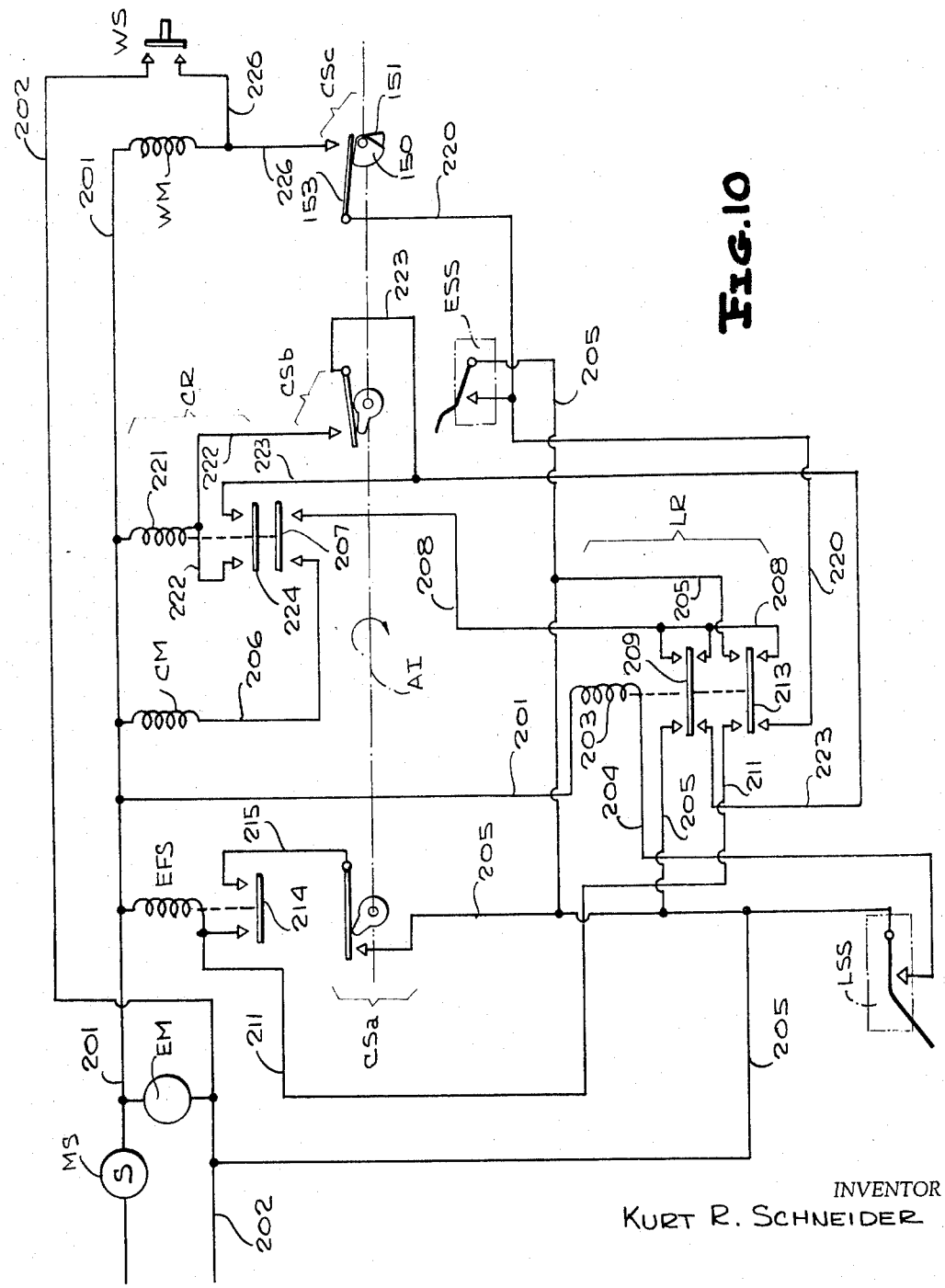

United States Patent Office 3,274,043
Patented Sept. 20, 1966

3,274,043
LABELING MACHINE
Kurt Rudolf Schneider, Bainbridge, N.Y., assignor to Eureka-Carlisle Company, a corporation of Delaware
Filed Jan. 29, 1962, Ser. No. 169,439
14 Claims. (Cl. 156—357)

This invention relates to a liquid delivery system which is of particular value for depositing stripes of water, upon a passing article, for predetermined stripe lengths along the article, while leaving other parts of the article dry.

An object of the invention is the provision of a liquid delivery system.

Another object is the provision of an apparatus for delivering a liquid to a relatively moving article at a predetermined rate and for a predetermined time.

Another object is the provision of apparatus for cyclically delivering a liquid to a succession of relatively moving articles for a predetermined part of the length of each such article, with abrupt starting and stopping of the delivery and the passage of a predetermined volume of liquid during each cycle.

Another object is the provision of an apparatus in which a stationary member has a delivery orifice which is presented along the path of a succession of moving articles, in which cyclically energized liquid delivery means cause the orifice to start and stop the delivery abruptly, and in which means are present to prevent contact of the articles with the stationary means.

Another object is the provision of an apparatus in which a stationary member has a delivery orifice and a liquid storage chamber, in which a primary storage reservoir is connected to the storage chamber for supplying the same, in which a valve is present between the reservoir and chamber effective to establish a hydraulic seal on said chamber to prevent movement of liquid through the orifice while the valve is closed, and cyclic means controlled by an article moving past the orifice for opening and closing the valve and thereby determining the location and duration of liquid delivery to the article.

Another object is the provision of an apparatus including means for moving articles in succession, a stationary member having a delivery orifice adjacent the path of movement of the articles, means for delivering liquid to the orifice including a valve controlling a hydraulic seal, and means for purging air initially from the delivery means.

With these and other objects in view, as will appear in the course of the following description and claims, an illustrative embodiment of the invention is shown on the accompanying drawings, in which:

FIGURE 3 is an upright section substantially on line 3—3 of FIGURE 1;

FIGURE 4 is a perspective view of a wetting member with its support and showing the lower surface of a distance member;

FIGURE 5 is a perspective view of the parts in FIGURE 4, showing the front and upper parts of the wetting and distance members;

FIGURE 6 is a sectional view substantially on line 6—6 of FIGURE 7, and showing a wetting member according to the invention;

FIGURE 7 is a sectional view of the same, substantially on line 7—7 of FIGURE 6;

FIGURE 8 is a conventionalized perspective view of driving means for the parts shown in FIGURE 2;

FIGURE 9 is an exploded perspective view showing a circuit controller in conventionalized form;

FIGURE 10 is a circuit diagram.

Figure 1:
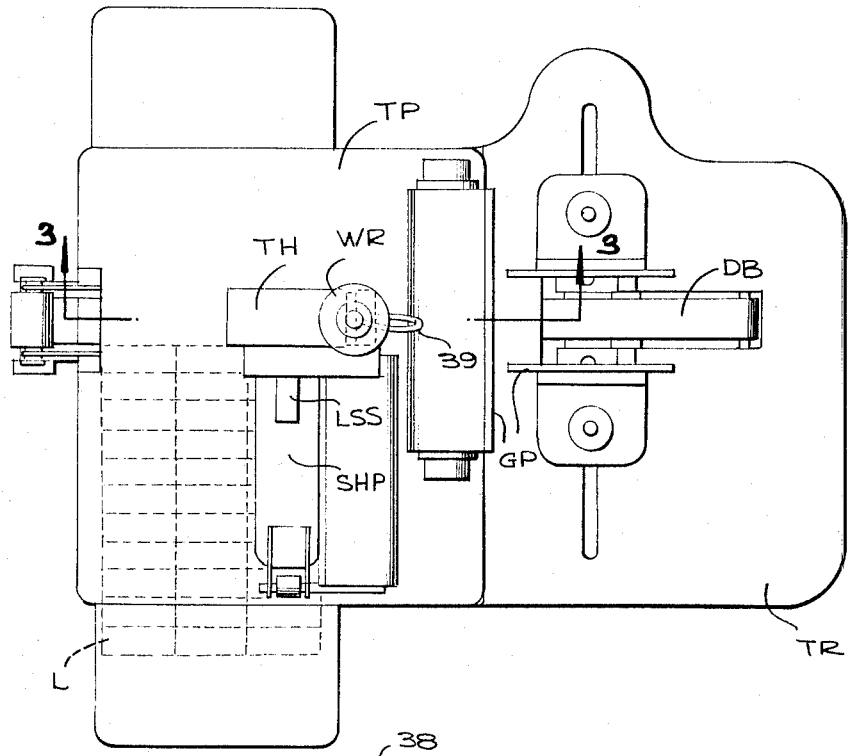
FIGURE 1 is a top plan view of a label applying machine, to which the invention has been applied.

The employment of the invention is illustrated in connection with a labeling machine of the type shown in my Patent 2,754,022, to which reference is made as to the general principle of successive feedings of articles and labels in interlocked relation to one another, with wetting of the articles, delivery and application of a label to each article, and the discharge of the labeled article from the machine. The machine has a base housing BH, a top plate TP, a punch housing TH, guides GP for the stack of the articles E above the article table TR, and means such as shuttle bars LFB (FIGURE 8) moving in grooves of plate TP for advancing a sheet L of labels.

The instant illustrative driving system and controls are shown in conventionalized form in FIGURES 8 and 10. When a main switch MS is closed, an electric motor EM is energized, which through appropriate speed reduction gearing 21 drives a shaft AC and thus by bevel gears 23, 24 turns the shaft 25 on which are mounted the article feed rollers EFR. The shaft 25 acts through gears 30, 31, 43 to drive the shaft 37 which includes universal joints 36 for permitting upward and downward movement of the stage S while maintaining the rotation of the stage rollers SR. A switch assembly AID surrounds the shaft AC and is controlled by a clutch solenoid CM which upon momentary energization procures a single revolution of an intermittently driven system which then comes to a standstill at the end of the revolution or cycle if the solenoid CM has been deenergized. An illustrative clutch is set out and claimed in my Patent 2,915,160, to which reference is made for details of the structure. The intermittently driven system includes a gear 45 in mesh with a gear 46 having a crank pin 162 thereon and itself in mesh with a gear 47 on a shaft 47a which acts by gears 48 to drive the cam shaft 49 which is connected to the punch-actuating cam PC within the punch housing TH. The gears 45, 46, 47 are illustratively helical for power transfer between the axes of gear 46 with its crank and gear 47 with its shaft 47a. The crank pin 162 actuates the pitman 160 and thereby the illustrated shuttle bars LFB so that the label strip L is advanced one label distance per cycle. The intermittently driven system also serves to actuate circuit closers and breakers in timed phase during the cycle: thus an intermittent or cyclic shaft AI (FIGS. 9 and 10) can form a switch-actuating part of the intermittent system, having cams for the switches CSa, CSb and CSc. The switch CSc comprises a pair of cams 150, 151 (FIG. 9) for moving a cam follower 153 effective by its movement to effect circuit closure and opening between the conductors 220, 226 with a function as set out hereinafter.

In operation, a label strip L is placed upon the table TP and is fed forward by the reciprocating shuttle bars LFB beneath a top label plate SHP until the foremost label comes beneath the actuating arm of a label switch LSS which is then opened. Circuits are thereby made and broken, as set out hereinafter, by which continuous reciprocation of the shuttle bars LFB ceases, and the feed fingers EFF (FIG. 3) are lowered. A supply E of articles, such as envelopes, is assumed present on the table TR, being advanced by the driven belt DB to pre-separator devices ERF located above the rotatable feed roller EFR. When the feed fingers EFF are in raised position by energization of the solenoid EFS, the articles are detained: when the fingers EFF are lowered, the bottom article is permitted to be moved forward by the driven feed roller EFR while the overlying articles are detained by the pre-selector ERF. As the bottom article is so moved, it is brought beneath the plate TP and to the first rollers SRa of a stage S, which are alined with a top roller RT. This stage S is urged upward by springs SS at its ends, and its end rollers SRa can move downward for receiving the article and then act to continue its advancement. The stage S has the driven feed rollers SR*a*, SR*b*, SR*c*, SR*d* . . . SR*h* mounted on parallel shafts thereof, so the article movement continues until it is ejected through the slot X. During the course of its travel, a selected part of its top surface is moistened as set out hereinafter, and then a label is delivered onto the moistened area. This label delivery is procured by the action of the normally open switch ESS having an actuating arm 136 which extends into the path of the moving envelope so the switch is closed thereby to establish control circuits by which the coil CM effects closure of the clutch AID for driving an intermittent shaft AI which begins a cycle during which the shuttle bars LFB move the sensed label to position above an aperture in the plate TP, a punch cam PC moves the punch body LP downward so its lower edges sever the advanced label and the label is delivered through the aperture and upon the moistened area of the article, and then the punch retreats upward. In the structure shown, the punch carries the rollers PR in alignment above stage rollers SR*c* and SR*d* for pressing the detached and delivered label against the article, the stage S moving downward against its springs SS to afford the counterpressure. Rollers RT are shown as mounted in the table TP above stage rollers, to reduce the friction between the article and the bottom of the table TP. The position of the switch ESS can be adjusted in the direction of article travel, as by the means shown in FIG. 4 of U.S. Patent 2,754,022, for determining the distance of wetting and label applying from the leading edge of the article.

The patent also shows a wetting device which is caused to wet the surface of the article before the label is applied thereto. The instant invention is concerned with a modified wetting device for the same purpose.

Figure 2:
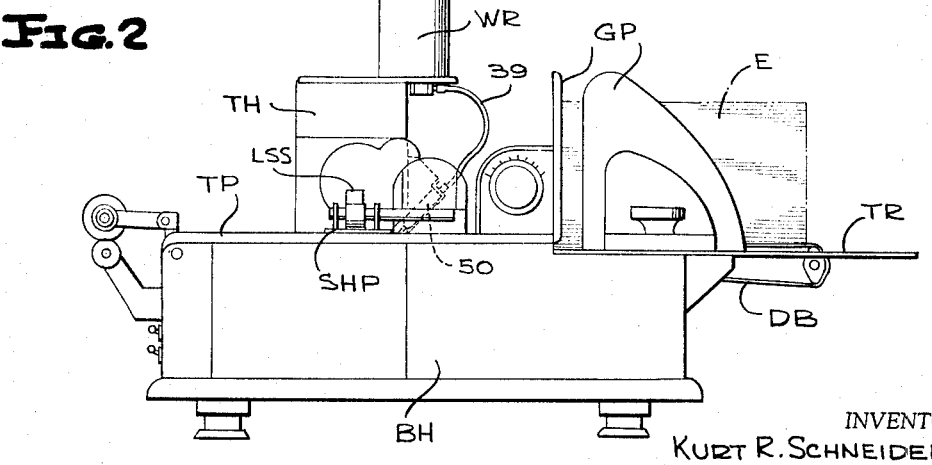
FIGURE 2 is a side elevation thereof.

The supply of water for moistening the passing articles is provided as shown in FIGURE 2. The reservoir WR is mounted at a high level, e.g., on the punch housing TH, and comprises an outer body 26, a base having an opening within a valve seat 32 for a needle valve with its stem 33. The body 26 has a cover 34 on which is mounted a solenoid WM effective when energized to lift the magnetizable portion 35 of the valve stem 33 and thus open the valve and permit water to flow into the hose 39. An adjusting screw and lock nut 38 is effective to determine the stroke of the valve stem assembly and therewith the amount of opening at the valve seat 32. An inner tube 28 surrounds the valve stem, with openings at its lower end, so water within the body 26 can pass toward the valve seat. A spring 29 acts to seat the valve when the solenoid is de-energized.

The wetting device is illustrated in FIGURES 3–7 as comprising a support body 40 having a rib 41 which is received in a groove 42 of the punch housing TH for alignment, so a screw 44 may be passed through a hole 44*a* of the block and rib and into the housing for holding the same in adjusted position.

A nozzle and manifold block 50 can be made of transparent plastic so the content of water and absence of bubbles may be observed. The block has a transverse bore to provide a manifold passage 51 whose end is later closed by a cemented plug 52. The rear of the block is drilled to receive a metal tube 53 for the lower end of the hose 39: this tube being open to the manifold passage 51 and sealed in place, e.g., by cement. Small holes are drilled at the front of the block and communicate with the manifold passage 51. A nozzle 55 is inserted into each hole and sealed therein. Each nozzle can be a small metal tube whose outwardly projecting end has been reduced to a conical shape 56, with the end cut at an angle in the illustrated form so that the edge is parallel to the path of article travel, denoted by the line 63 in FIGURE 7, conforming to the inclined position of the block 50 in FIGURE 3.

An envelope stripper or distance member is provided by a comb 60 which is fitted against the lower surface of the block 50 and projects past its lower edge, being formed with curved fingers 61 which serve to determine the position of the upper surface of the article relative to the ends of the nozzles. The comb 60 and its teeth 61 are stiff, and the teeth are located above the stage rollers SR*b* (FIG. 3) and thus at a point where the position of the upper surface of the article is being fixed by the stage assembly in cooperation with the upper rollers RT. The comb teeth 61 prevent the upper surface of the article, if buckled, from coming into direct contact with the ends of the nozzles and depositing dirt or lint thereon. In practice, the nozzle ends can be fixed at about $\frac{1}{64}$ of an inch above the lowest points of the comb teeth, and thus at such distance from the upper surface of a passing article. Therewith the beads of water which form at the ends of the nozzles, when the valve 32 is opened, extend into contact with the passing article.

The block 50 and stripper 60 are held to the body 40 by a clamp piece 65 which has a flange 66 under the stripper 60, a web 67 which fits against the wall 68 of a rebate in the body 40 and thus serves to locate the block 50 and the stripper relative to the body, and an upper flange 69 through which screws 70 are passed into the body 40 for clamping the parts, noting that the total of the thickness of the stripper 60, the block 50 and the height of the wall 68 of rebate are greater than the dimension of the web 67 so a resilient pressure is maintained.

The moistening system will be illustrated for the employment of labels having gum on their lower surfaces, with water used to render the gum adhesive.

While the valve 33 closes the seat 32 located at the bottom of the body 26 and communicating with the hose 39, a hydraulic seal is established for the conduit comprising the hose 39 and the block 50, and no water is delivered from the nozzles 56, noting that the last delivery has drawn upon the droplets at the nozzles.

When the water solenoid WM is energized, the valve 33 is lifted by a distance controlled by the stroke and determined by the adjustment means 38. The water in the tube 28 has a pressure head above the nozzles 56, and downward flow now occurs, so water emerges from the nozzles and is taken by the passing article. Such water delivery is started when the cam assembly 150, 151 of FIGURE 9 engages and moves the follower 153 to close the circuit at switch CS*c*. The assembly 150, 151 is adjustable on the intermittent shaft AI, so the delivery to the article starts at a pre-selected phase of the shaft cycle, and thus at a predetermined distance from the leading edge of the article, under control of the envelope switch ESS and its clutch-engaging circuits. When the cam assembly 150, 151 releases the actuator 153 of the switch CS*c*, the circuit to the water solenoid WM is opened, the spring 29 immediately closes the valve 33 and the water delivery ceases. The arcuate distance occupied by the cam assembly 150, 151 can be adjusted by displacing the cam 151 relative to cam 150 so the total arc is greater or lesser, to cause the water delivery to occur for a greater or lesser length along the article. The cams 150, 151 are normally clamped together and in fixed phase relation on the shaft AI by the nut 152.

In practice, when gummed labels one inch high and about 2⅜ inches wide are provided in the label strip, a needle valve 33 about ⅛ inch in diameter has been found satisfactory with seven nozzles 56 about 0.093 inch in outside diameter within the body 50 and having a main bore about 0.032 to 0.040 inch diameter and an extension bore of 0.015 to 0.017 inch diameter leading to the end of the illustrated tapes, and a wall thickness of 0.007 to 0.010 inch at the free end. In the illustrated form, the body is mounted at about 45 degrees to the vertical, but this position is not restrictive as the nozzle tubes can be vertical under this invention: the ends of the nozzle tubes are shown as cut away at a like angle, so the end surfaces around the orifices are parallel to the direction of article travel. The comb 60, 61 acts as a distance member, to hold the orifice mouths about 1/64 inch above the path of the upper surface of the articles even when the article is a thin paper sheet which may buckle during passage opposite the orifices. Such structure delivers seven transversely spaced streaks of water onto the upper surface of the individual passing article, starting and ending abruptly, and with a total volume of water controlled at the valve 33 and divided uniformly among the seven orifices. In practice, the tapered form, and thin wall around each orifice, are effective to prevent beads of water from clinging to the end or side surfaces of the nozzle tubes after the valve has closed.

The clutch cycle, started when the switch ESS is closed by article contact, can complete the rotation of shaft AI (FIGS. 9 and 10) in 0.25 second with the stage rollers SRa, SRb having a peripheral speed which advances the article by 7 inches during this time; and the cam 150 can be set in phase on the shaft AI to close switch CSc and initiate water delivery at a point 2 inches from the leading edge of the article, e.g., an evelope. As the shaft AI turns, its cams 150, 151 will hold the switch CSc closed for an arc representing 2 3/8 inches of article travel, and water flows past the valve 33 and from the nozzles for this time and distance. Cam 151 then releases the follower-actuator 153 and procures opening of switch CSc: valve 33 abruptly closes and re-establishes the hydraulic seal so that the water in the conduit system downstreamward of valve 33 is brought to a standstill, and no water thereafter emerges from the nozzles 56. The result is the delivery from each nozzle of a stripe or streak of water onto the article, which streak is about 2 3/8 inches long and has sharply defined starting and finishing ends. The length of the streak, for given speeds of the rollers SRa . . . SRh and the shaft AI, can be varied by the angle subtended by the cams 150, 151, and its start by the phase position of cam 150 on the shaft AI.

The circuit diagram of FIG. 10 shows connections by which labels and articles are fed in regular order, with energization of the moistening operation.

An initial or zero position is with the intermittent shaft AI at a standstill with CSa held open by its cam and CSb in normally open position: CSc is likewise open. Relay CR is in deenergized or lower position. Solenoids CM and WM are deenergized, with the clutch open and the water valve closed.

When the main switch MS is closed, conductor 201 is charged and electric motor EM runs.

It will be assumed that a fresh label strip L is introduced to the shuttle bars LFB, but not as far as the label switch LSS.

The switch LSS is closed, in the absence of a label thereat; and a circuit is established:

(a) 201–203–204–LSS–205 back to conductor 202: the label relay LR is energized and its bridges rise and close a circuit:

(b) 201–CM–206–207–208–209–205 back to conductor 202: the clutch solenoid CM effects clutch closure. The intermittent shaft AI rotates with switch CSa being closed at the beginning and until the end of the cycle, and momentarily closes a circuit at CSb. Each cycle of shaft AI also produces motion of the label strip, with regular advance by one label distance for each cycle. This cycling continues until a label comes to LSS and thus opens circuit (a). The label relay LR is deenergized, and circuit (b) is opened at bridge 209. The movement of the shaft AI stops at the end of the prevailing cycle, with switches CSa and CSb open.

Assuming that articles are present on table TR, e.g., a stack of envelopes, no feeding has occurred while LSS has been closed (no label) and relay LR has been energized, because the feed fingers EFF have been held raised by the solenoid EFS by the circuit:

(c) 201–EFS–211–213–205 back to conductor 202: this energization being maintained, after the momentary opening of CSa at the start of a cycle, by:

(d) 201–EFS–211–214–215–CSa–205 back to 202.

When an article is being detained by fingers EFF, and a label comes to label switch LSS and opens it, the relay LR is de-energized. Circuits (a) and (b) are opened as described above: and also circuit (c) is opened at bridge 213. Circuit (d) is open at switch CSa. Thus solenoid EFS is de-energized and the article passes to the stage S, and encounters and closes the article switch ESS, to form the circuit:

(e) 201–CM–206–207–208–213–220 – ESS – 205 and back to 202. The clutch is closed and the cycle of shaft AI starts. When AI starts, switch CSa is open, and the maintaining circuit to EFS is not operative. Shaft AI momentarily closes CSb and the circuit:

(f) 201–221–222–CSb–223–209–208–213–220 – ESS–205 back to 202. The coil 221 of relay CR is energized, and bridge 207 breaks circuit (e) at bridge 207 so the clutch will open at the end of the prevailing cycle. Also relay CR sets up its own maintaining circuit:

(g) 201–221–222–224–223–209–208–213–220 – ESS–205 back to 202, so relay CR remains energized after CSb opens again. Both circuits (f) and (g) are controlled by the switch ESS and the relay LR, so these circuits are broken as soon as the trailing edge of the article releases ESS, or as soon as the label switch LSS discovers that there are no more labels in the strip, and closes to energize relay LR.

During the course of the cycle of shaft AI, switch CSc closes and then reopens. While closed, the water solenoid WM is energized and the valve 33 opened, by the circuit:

(h) 201–WM–226–CSc–220–ESS–205 and back to 202. It will be noted that this circuit is controlled by the envelope switch ESS.

The resulting effects are that the presence of a label at the label sensing switch LSS procures the feeding of an article. The article then acts at switch ESS and procures a cycle of the shaft AI by which the article is wetted for a predetermined area, the label applied to this area, and a new label (if such be present) is brought to the switch LSS so the action can be repeated. When either labels or articles are exhausted, the operations stop except for the movement of the shuttles to take charge of a fresh label strip when presented, and of the feed and stage rollers to take charge of another article under control of the feed fingers EFF. Unless the label switch LSS has found a label ready for use and has effected release of an article so that ESS is closed, the wetting valve is not opened.

In starting a dry machine, the water reservoir WR is filled. The air in the hose system is preferably expelled before labeling operations are begun, to avoid having non-moistened conditions for the first few envelopes. Water in the reservoir WR enters the tube 28 and the water then rises in the tube 28 with the air escaping at its upper end, e.g., around the valve stem 33. When the manual water switch WS is pressed, a circuit is closed 201–WM–226–WS–202 and the valve 33 is held open so long as switch WS is pressed. The water in tube 28 then flows downward in the hose 39 and the block 50 and can flow to the nozzles 56, pushing the air ahead of it. Such purging of air from the system assures regularity of action of the hydraulic seal system below the valve 33, with freedom from pulsing flow due to cushioning effects of air bubbles.

In practice, to avoid escape of water through the nozzles if the water switch WS is held closed for too long a time, the bolck 50 can be released from its support and held with the nozzles 56 upward at a level slightly below the water level in the body 26, wherewith the air escapes as the water level rises in the block and nozzle structure. When water appears at the nozzle openings, the manual switch WS is released so the valve 33 closes and the hydraulic seal is established, ready for the start of labeling operations. The block 50 and its comb 60 are replaced in the holder.

An alternative method is feasible with the structure shown in FIGS. 4–6, whereby the block 50 need not be removed and replaced. The block 50 has the manifold passage 51 and nozzles 56 as described. The hose 39 delivers water to the manifold 51. A duct 500 leads upward from the manifold 51 to a chamber 501 which has an apertured plate 502 secured at its upper end. A valve button 503 projects through the plate 502 and web 67, with air escape space around the button. The button is connected to a valve body 504 which can seal the plate and therewith the chamber; being urged toward closure by a spring 505. When the switch WS is closed as before and the button 503 depressed, the valve 33 opens, and water flows to fill the hose 39 and the manifold 51, forcing air ahead of its flow and thus through the duct 500 and outward through the space around button 503. When the air is expelled and the manifold 51 is full of water, the passage of water around button 503 is noted, and the button is released, e.g., concurrently with opening of the switch WS.

The illustrated practice is not restrictive, and the invention can be practiced in many ways within the scope of the appended claims.

What is claimed is:

1. Moistening apparatus comprising a support, means for moving articles in succession along the support with a selected part of a surface of each article moving along a predetermined path, a reservoir for liquid mounted on the support above the level of the said path, a duct for conveying liquid downward from the reservoir, a nozzle fixed on the support and connected for supply through said duct and having an orifice positioned at a distance from said path for forming a liquid bead at the end of the nozzle during the flow of water from the reservoir, said bead extending from the nozzle for contact with the part of the article surface in said path for wetting the same, a valve effective when closed for preventing liquid flow through the duct and thereby establishing a hydraulic seal to prevent formation of a bead at the nozzle orifice and means on the support for preventing contact of the article with the nozzle end and means for varying the opening time of said valve for adjusting the area of application of the bead upon the article surface.

2. An apparatus as in claim 1, wherein said varying means includes means responsive to the moving articles and effective to procure opening and closing of the valve in timed relation to movement of the article whereby the liquid is deposited from said nozzle within the area of said selected part and for a limited length thereon.

3. An apparatus as in claim 2, including means for feeding and placing gummed labels on the wetted area, means for preventing the movement of the articles, and means responsive to the presence of a label ready for such placing and effective for overriding the preventing means and procuring the advancement of an article for actuating said article responsive means.

4. An apparatus as in claim 2, in which said means includes a cyclically driven device and means for starting and stopping the same, a switch controlled by said cyclic device and circuits connected therewith for effecting the said opening and closing of the valve.

5. A moistening apparatus comprising a support, means for moving articles in succession along the support with a selected part of a surface of each article moving along a predetermined path, a block fixed on the support and having a manifold chamber therein, a plurality of nozzles in communication with said chamber and having projecting ends with restricted orifices therein spaced laterally across the surface of the article traveling along said path, a reservoir mounted on the support above said block and a duct therefrom for supplying liquid to said chamber and thence through the nozzle orifices whereby liquid beads are formed which project from the orifices into contact with the surface of an article moving along said path, a valve effective when closed for preventing liquid flow to the orifices and thereby establishing a hydraulic seal to prevent the formation of liquid beads projecting from the orifices, means on the support to prevent contact of the articles with the walls around said orifices, the block having a second duct which leads from an upper part of said chamber and an air valve for closing said duct, whereby the opening of said valves permits the flow of water from the reservoir to fill the chamber with expulsion of air past said air valve.

6. A moistening apparatus comprising a support, means for moving articles in succession along the support with a selected part of a surface of each article moving along a predetermined path, a block fixed on the support and having a manifold chamber therein, a plurality of nozzles in communication with said chamber and having projecting ends with restricted orifices therein spaced laterally across the surface of the article traveling along said path, a reservoir mounted on the support above said block and a duct therefrom for supplying liquid to said chamber and thence through the nozzle orifices whereby liquid beads are formed which project from the orifices into contact with the surface of an article moving along said path, a valve effective when closed for preventing liquid flow to the orifices and thereby establishing a hydraulic seal to prevent the formation of liquid beads projecting from these orifices, means on the support to prevent contact of the articles with the walls around said orifices, and the contact preventing means comprising a comb having teeth positioned adjacent and spaced laterally from the nozzle orifices.

7. Moistening apparatus comprising a support, means for moving articles in succession along the support with a selected part of a surface of each article moving along a predetermined path, a reservoir for liquid mounted on the support above the level of said path, a duct for conveying liquid downwardly from the reservoir, a nozzle fixed on the support and connected for supply through said conduit and having an orifice positioned at a distance from said path for forming a liquid bead at the end of the nozzle during the flow of water from the reservoir, said bead extending from the nozzle for contact with the part of the article surface in said path for wetting the same, a valve effective when closed for preventing liquid flow through the duct and thereby establishing a hydraulic seal to prevent formation of a bead at the nozzle orifice, and a distance member fixed on the support and having a part positioned adjacent the nozzle orifice for preventing contact of the moving article with the wall of said orifice while permitting contact of the article with the bead when formed.

8. A moistening apparatus comprising a support, means for moving articles in succession along the support with a selected part of a surface of each article moving along a predetermined path, a block fixed on the support and having a manifold chamber therein, a plurality of nozzles in communication with said chamber and having projecting ends with restricted orifices therein spaced laterally across the surface of the article traveling along said path, a reservoir mounted on the support above said block and a duct therefrom for supplying liquid to said chamber and thence through the nozzle orifices whereby liquid beads are formed which project from the orifices into contact with the surface of an article moving along said path, a valve effective when closed for preventing liquid flow to the orifices and thereby establishing a hydraulic seal to prevent the formation of liquid beads projecting from the orifices, and means on the support to prevent contact of the articles with the walls around said orifices.

9. Moistening apparatus comprising a support, means for moving articles in succession along the support with a selected part of the surface of each article moving along a predetermined path, a reservoir for liquid mounted on the support above the level of said path, a duct for conveying liquid downward from the reservoir, a valve effective when closed for preventing liquid flow through the duct, a nozzle fixed on the support and connected for supply of liquid through said duct and having at its end a restricted orifice positioned adjacent said path so that when said valve is open a liquid bead is formed to project from the orifice for contact with an article surface moving along said path, means fixed on the support for preventing contact of the article with the nozzle end, means responsive to the moving articles along the support and means actuated by the responsive means for actuating said valve to an open position in timed relation to the moving articles for directly forming the liquid bead at said orifice.

10. An apparatus as in claim 9, including a cyclically operable device, said means responsive to the moving articles being effective to procure a cycle of movement of said cyclic device during the passage of an article, and means controlled by the cyclic device for effecting opening and closing of said valve.

11. An apparatus as in claim 10 in which the valve controlling means includes means for varying the times of valve opening and closing during the cycle.

12. An apparatus as in claim 11, in which said cyclic device and the means controlled thereby include a shaft, cam pieces on the said shaft adjustable about the shaft axis and peripherally relative to one another for fixing the phase position of the start and the end of actuation by said pieces, means to fix the cam pieces in adjusted position on the shaft, a cam follower actuable by said cam pieces, and means controlled by the cam follower for opening and closing the said valve.

13. A wetting device comprising a body, a manifold in said body, conduit means opening into said manifolds for admitting liquid from a reservoir therein, a plurality of nozzles opening outwardly of said manifold, and a distance member carried by said body to maintain orifices of the nozzles in predetermined spaced relationship to an upper surface of an article with which the wetting device is associated, said distance member being a comb-like structure having a plurality of teeth disposed adjacent said nozzles.

14. A wetting device comprising a body, a manifold in said body, conduit means opening into said manifolds for admitting liquid from a reservoir therein, a plurality of nozzles opening outwardly of said manifold, and a distance member carried by said body to maintain orifices of the nozzles in predetermined spaced relationship to an upper surface of an article with which the wetting device is associated, said distance member being a comb-like structure having a plurality of teeth disposed adjacent said nozzles, adjacent ones of said teeth defining a space therebetween, and an associated nozzle being in planar alignment with each of said spaces.

References Cited by the Examiner
UNITED STATES PATENTS

| | | | |
|---|---|---|---|
| 2,029,922 | 2/1936 | Heckel et al. | 156—269 |
| 2,405,742 | 8/1946 | Fulfer | 156—575 |
| 2,754,022 | 7/1956 | Schneider | 156—364 |

EARL M. BERGERT, *Primary Examiner.*

R. I. SMITH, M. L. KATZ, *Assistant Examiners.*